Nov. 1, 1960   A. W. KOLB, JR   2,958,835
PICKUP INSTRUMENT FOR MEASURING DEVICE
Filed Jan. 31, 1958   3 Sheets-Sheet 2
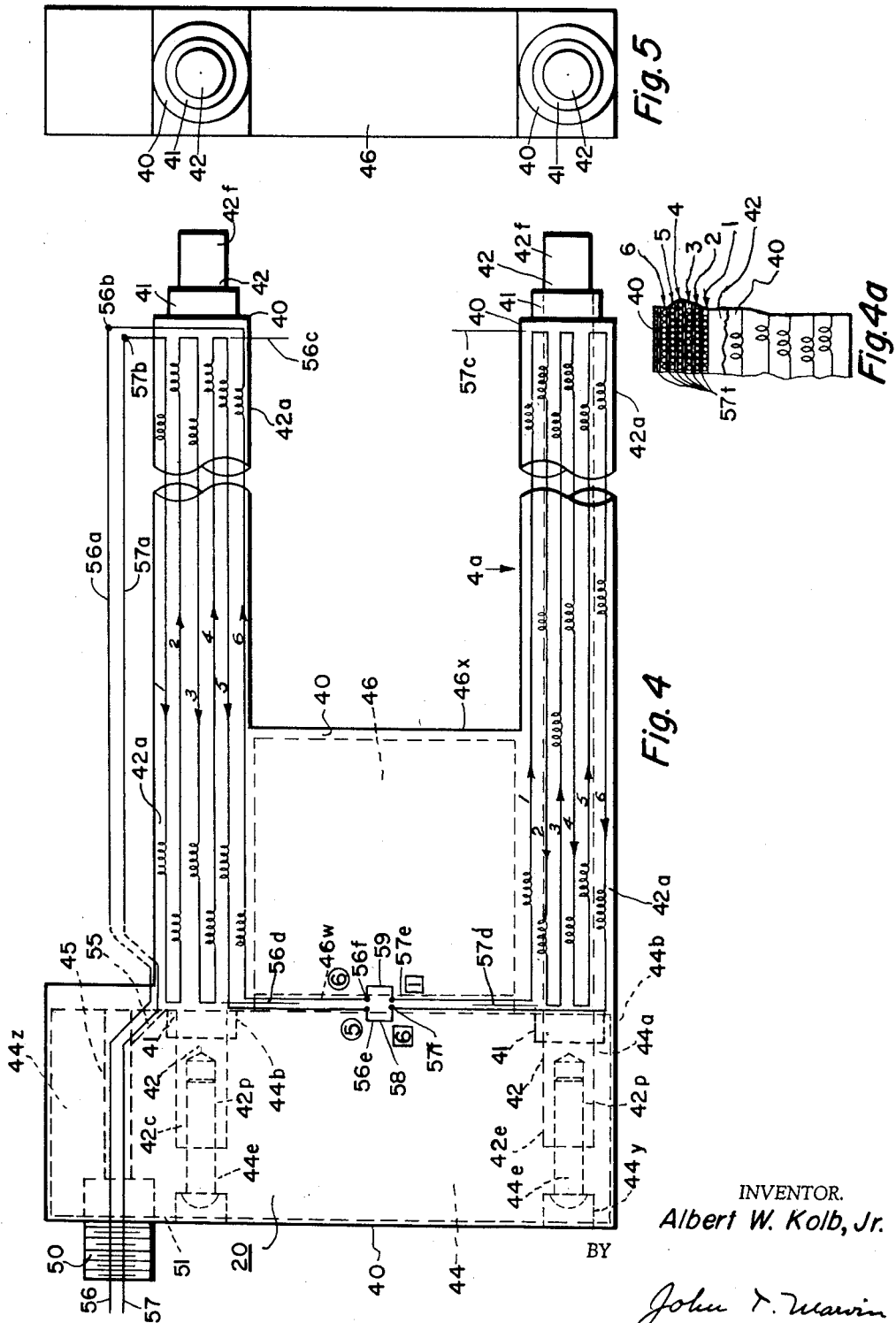
INVENTOR.
Albert W. Kolb, Jr.
BY John T. Marvin
His Attorney Nov. 1, 1960
A. W. KOLB, JR
2,958,835
PICKUP INSTRUMENT FOR MEASURING DEVICE
Filed Jan. 31, 1958
3 Sheets-Sheet 3
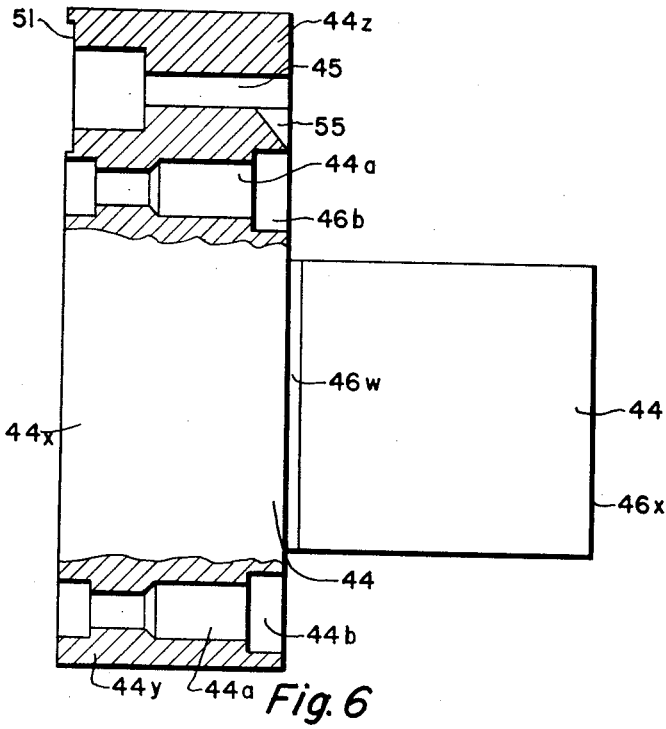
Fig. 6
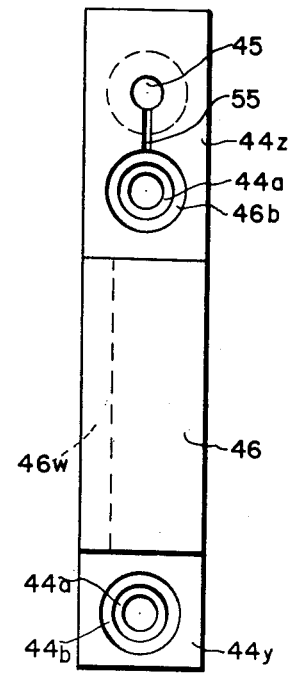
Fig. 6a
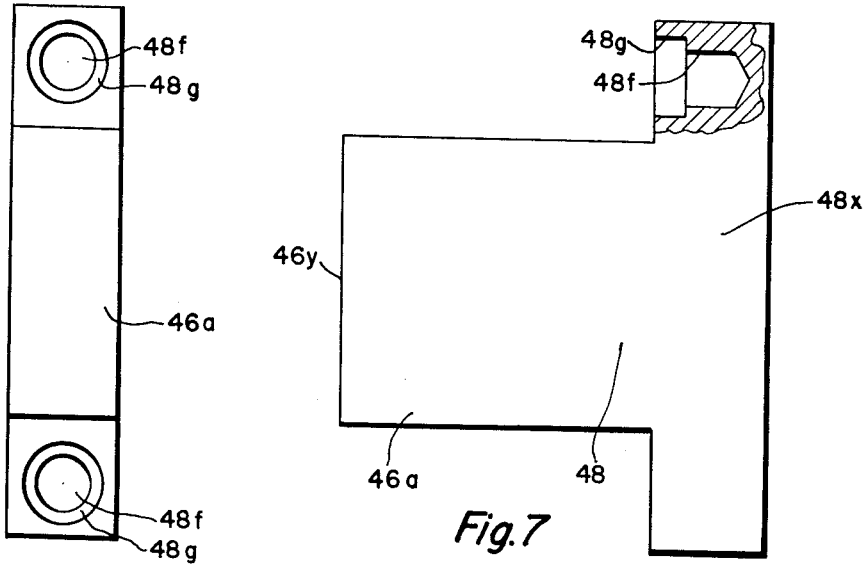
Fig. 7a
Fig. 7
INVENTOR.
Albert W. Kolb, Jr.
BY
John T. Marvin
His Attorney

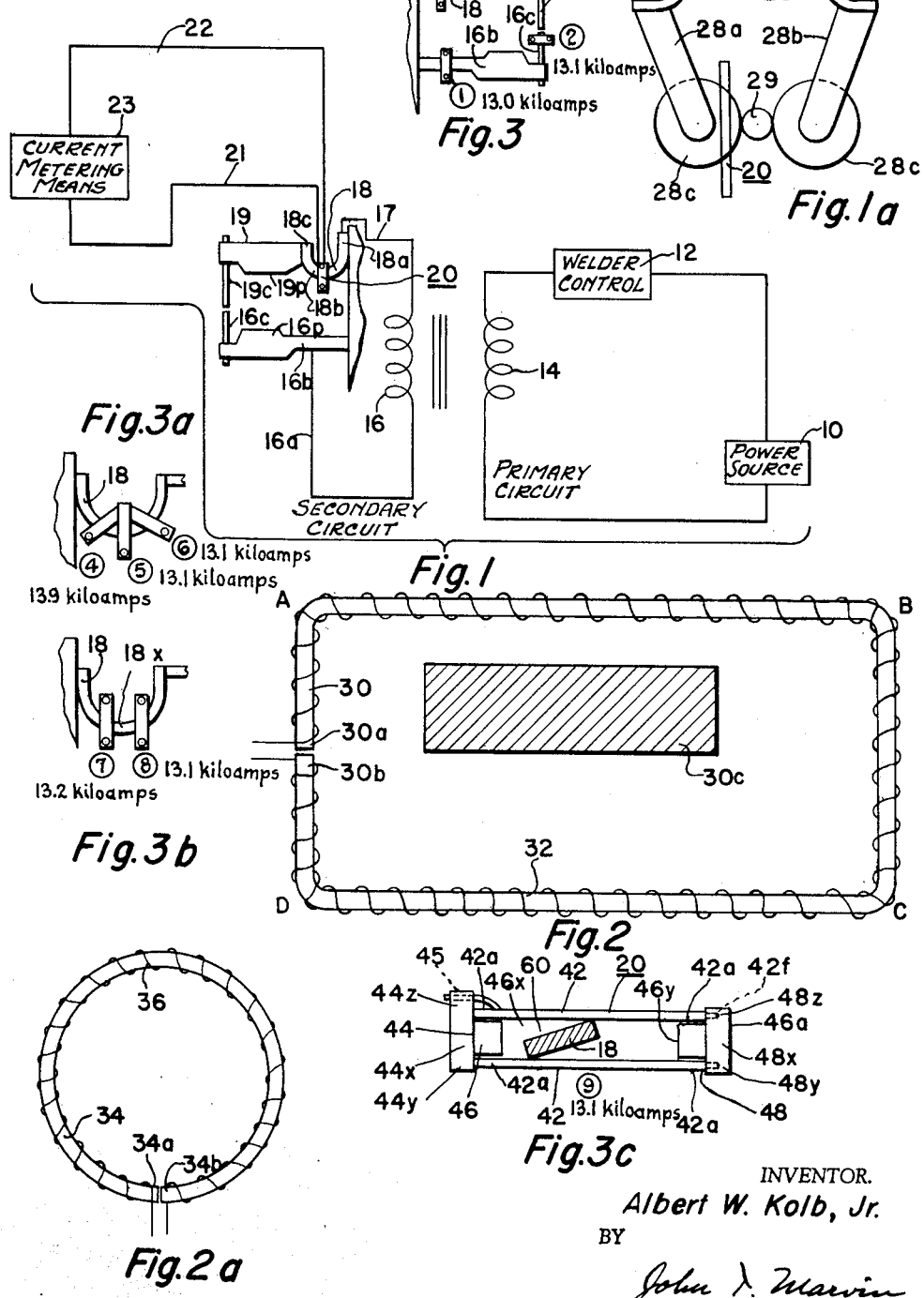

United States Patent Office 2,958,835
Patented Nov. 1, 1960

2,958,835

PICKUP INSTRUMENT FOR MEASURING DEVICE

Albert W. Kolb, Jr., Dayton, Ohio, assignor to General Motors Corporation, Detroit, Mich., a corporation of Delaware Filed Jan. 31, 1958, Ser. No. 712,584

4 Claims. (Cl. 336—174)

This invention relates to electrical measurements and particularly, to a pickup instrument for use with an electrical measuring or indicating device.

An object of this invention is to provide an air-core pickup-coil instrument adapted to be positioned relative to a current-carrying member and adapted to be fitted relative thereto without disassembly of any mechanical supporting fixtures of the current-carrying member while providing a pickup coil structure including a predetermined end spacing means relative to a predetermined number of turns of wire wound on parallel support portions through which an electromotive force or E.M.F. is induced by electromagnetic induction in proportion to electricity passing through the current-carrying member when the latter is positioned between the parallel support portions carrying the predetermined number of turns of wire.

Another object of this invention is to provide a pickup instrument for coupling an electrical measuring or indicating means such as a current meter or an oscilloscope relative to a current strap or electrode means of a single-phase resistance welding apparatus subject to welding variables such as varying weld current, weld time, and electrode force that are encountered and must be controlled to obtain consistent welds on a mass production basis facilitated through use of a pickup instrument which provides an accurate and convenient means of measuring weld current that determines the heat applied to a weld and which includes parallel type pickup coil portions each having a winding of a predetermined number of turns per inch extending along insulating material supports which are adapted to be installed around flexible secondary leads or flexible straps sometimes called current shunts or pigtails of a press-type welder and which are maintained parallel to each other by end members having projecting portions extending toward each other at opposite ends and adapted for maintaining predetermined lateral spacing of one or more straps relative to the windings on the parallel supports.

Another object is to provide a parallel-type pickup coil means for use in resistance welding current measurements and including a coil made by uniformly winding turns of wire back and forth in layers over a pair of insulating material rods each having oppositely wound ends extending laterally beyond projections of end members provided to maintain the rods in substantially parallel relationship to each other and provided to serve as stop members limiting positioning of current-carrying means within the confines of the substantially parallel rods and ends of the projections of the end members.

Another object is to provide a parallel-type pickup coil means for use in resistance-welding secondary current measurements and including a coil made by uniformly winding turns of wire back and forth in layers finally embedded in a resinous material over a pair of insulating material rods each having oppositely wound ends each having at least 2½ inches of coil beyond an end of an inwardly projecting central stop portion of each of a pair of end members provided to hold the rods in substantially parallel relationship to each other.

Further objects and advantages of the present invention will be apparent from the following description, reference being had to the accompanying drawings wherein a preferred embodiment of the present invention is clearly shown.

In the drawings:

Figure 1 is a schematic diagram of welding apparatus of a type used for spot and projection welding on presstype welders and a measuring-device pickup instrument in accordance with the present invention is illustrated in a position for use in metering or indicating resistance welding current.

Figure 1a is a fragmentary schematic diagram of a throat layout of seam welding apparatus relative to which a measuring-device pickup instrument in accordance with the present invention is illustrated in a position for sensing resistance welding current to be indicated or metered.

Figure 2 is a layout drawing of a closed-loop pickup coil having uniform turns of wire thereon.

Figure 2a is a plan view of an air-core, toroidal-type pickup coil having a split ring support.

Figures 3, 3a, 3b and 3c illustrate several positions and sample current readings obtainable when the pickup instrument of the present invention is used on welding apparatus.

Figure 4 is a fragmentary side elevational view of a pickup instrument in accordance with the present invention.

Figure 4a is an enlarged partially sectioned fragmentary view taken in the direction of arrow 4a in Fig. 4 of a portion of a rod and windings as well as insulation thereof.

Figure 5 is an end view of the pickup instrument of Fig. 4.

Figure 6 is a side view of one end member provided for the pickup instrument of Fig. 4.

Figure 6a is an end view of the member of Fig. 6.

Figure 7 is a side view of an opposite end member or cap for use with the pickup instrument of Fig. 4.

Figure 7a is an end view of the member of Fig. 7.

With particular reference to Fig. 1, there is illustrated a schematic diagram of welding apparatus of a type used for spot and projection welding and having primary and secondary circuits interrelated in the following manner. There is provided a source of power indicated by numeral 10 which is connected in series with a welder control 12 and a primary reactance 14 of a saturable-core welding transformer. The primary circuit is magnetically coupled through the reactance 14 relative to a secondary reactance 16 of a secondary circuit including a conductor 16a connected to a bottom member 16b that carries an electrode 16c. The reactance 16 is also connected through a conductor 17 to a flexible secondary lead or flexible strap 18 sometimes called a current shunt or pigtail of a press type welder. The pigtail 18 is substantially U-shaped and includes one end 18a connected to the conductor 17 and has a U-shaped portion 18b and opposite end 18c suitably connected electrically to a movable electrode member 19 that carries an electrode 19c. The electrodes 16c and 19c extend toward each other as illustrated in the diagram of Fig. 1 and the members 16b and 19 are provided with projection portions 16p and 19p extending toward each other from each of the members and terminating along surfaces opposite each other at a distance between the surfaces which is commonly identified as "throat height" for the welding apparatus. In the particular apparatus illustrated schematically in Fig. 1, the member 19 is movable or capable of being shiftable back and forth relative to the member 16b so as to effect positioning of the electrodes 16c and 19c relative to each other for establishing a resistance welding current between adjacent ends of the electrodes that result in a flow of current for a predetermined time interval and effecting a predetermined heating of metal or other fusible materials positioned and to be joined relative to each other between adjacent ends of the electrodes.

Weld current, weld time and electrode force must be properly selected and maintained to determine heat applied to affect proper weld quality during mass production welding scheduling. Such welding scheduling makes it necessary to have available necessary equipment for production trouble shooting of defective welds and for proper installation and maintenance of welding equipment. Measurement of weld current facilitates proper selection of welding equipment and control and power means therefor. Various approaches have been tried in the past for achieving a measurement of resistance welding current. Included in these methods have been approaches involving primary current measurements in the primary part of the circuit of Fig. 1. These have involved use of an oscilloscope, oscillograph, or split-core current transformer and a pointer stop ammeter having either a dynamometer or an iron vane movement for measuring primary current which can be in phase or phase shifted depending upon the particular circuit components added to the primary circuit for use in detecting primary current magnitude. However, since the secondary or resistance welding current specifically is to be measured, a complicated conversion is necessary involving consideration for transformation losses such as resistance drops in the primary circuit, magnetizing current, hysteresis and eddy-current power loss as in the iron and leakage reactance voltage drops resulting in a reduction in accuracy in measuring primary current from which the secondary current is to be calculated. Stray electromagnetic fields cause inaccuracy to be reflected in an oscilloscope or an oscillograph in addition to unknown transformer losses. Furthermore, considerable time is involved in obtaining the desired secondary resistance welding current and the measurements are limited to use of 100% of primary currents. Skilled personnel are necessary to operate the equipment and to make the necessary calculations to determine the secondary current. Much time and a large amount of equipment is required.

A different approach in a method of determining resistance welding current has been tried by placing a shunt in the secondary circuit but this is unsatisfactory and unsuitable because of the requirement of an installation of a shunt in each welder. Furthermore, the introduction of iron into the secondary welding circuit causing a change in current magnitude makes what is known as an iron-core current transformer method inadequate. A more satisfactory method of measuring secondary current directly by using a phase shifted current meter is an approach made practical through use of the pickup instrument of the present invention. As illustrated in Fig. 1, a pickup instrument generally indicated by numeral 20 is positioned relative to the pigtail or flexible secondary lead 18 through which the resistance welding current must pass in the secondary circuit relative to the electrodes 16c and 19c. The pickup instrument is provided with a winding having a pair of leads 21 and 22 leading outwardly from the pickup instrument to a current metering means or indicating device generally indicated by numeral 23. The metering or indicating means 23 as provided for the pickup instrument of the present invention can be a phase-shifted current meter or an oscilloscope having a screen on which there is a tracing of a wave shape of current passing through the flexible secondary lead or strap 18 to the electrodes for achieving the welding operation. An amplifying means can be provided for the current metering means 23 if necessary.

As a modification of the use of the pickup instrument 20 of the present invention, Fig. 1a illustrates a fragmentary schematic diagram of a throat layout of seam welding apparatus having pigtails or flexible secondary leads or straps 28 provided for each of a pair of members 28a and 28b carrying wheels or electrodes 28c on opposite sides of a weldment 29 provided therebetween. The pickup instrument 20 is positioned so that one of the wheels 28c through which the secondary resistance welding current passes will register and induce an electromagnetic force proportional to the secondary welding current for metering or indicating the magnitude of the current directly from the secondary circuit as outlined in Fig. 1.

As a background for understanding measurement of secondary current using a phase shifted current meter, a voltage is required which is proportional to rate of change of welding current in the secondary circuit. Previously toroidal instruments have been used with phase-shifted current meters and these toroids have been installed around conductors or electrode tips where there is less than ¾ of an inch clearance. A pickup coil having a toroidal winding is satisfactory for many spot and projection welding applications. However, during upset butt welding and seam welding as well as spot and projection welding, electrodes are provided integrally as part of a fixture or structure for holding and locking the pieces to be welded. Sometimes larger electrodes are even water cooled and therefore water lines leading to the electrodes and mechanical clamping fixtures are quite bulky and complicated and are not easily disassembled merely for positioning of a toroid closed-loop type of pickup coil. Thus it is impractical in some welding applications to use a toroid pickup device for measurement of secondary resistance-welding current.

Referring to Figures 2 and 2a, there are illustrated closed-loop or toroid-type pickup coils being referred to to obtain an understanding of a few of the basic laws of electromagnetics concerning an analysis of how voltage induced in a pickup coil is proportional to the current in the current carrying member or electrode that the toroidal coil surrounds. One basic law states that the line integral of the tangential component of the magnetic field in density around any closed path equals .4 times the current the path encloses. The law of electromagnetic induction states that the E.M.F. induced in a circuit when it cuts the lines of a magnetic field is at any instant equal to the rate at which magnetic flux is being cut at that instant. By definition, the total flux is equal to the flux density times the cross sectional area. When a coil is made by uniformly winding turns of wire over a support member, a predetermined number of turns per centimeter or per inch must be provided to provide necessary sensitivity to flux that has an average magnetic density over a predetermined area along an axis of the winding at any given point. This area is equal to the area of one turn which is slightly more than the cross sectional area of a core or support on which the wire is wound. Since the plane of each individual turn is essentially at right angles to the axis of the core, a voltage caused by a changing magnetic field will be induced only by components tangential to the axis of the core. In Fig. 2 there is illustrated a support 30 having adjacent ends 30a and 30b of a closed-loop pickup instrument having a toroidal winding 32 provided thereon as is commonly known to those skilled in the art of electrical measurements involving the use of toroids. The toroid illustrated in Fig. 2 has 4 corners in its substantially rectangular configuration and these corners are identified by the letters A, B, C, and D. A current-carrying member or electrode 30c is shown positioned within the confines of the closed loop of the pickup device in Fig. 2. By reducing the uniformly wound turns of wire from the segments A—D and B—C, voltage induced in the segments of windings A—B and C—D in proportion to current carried in member 30c is reduced. When moving the conductor or current carrying member 30c toward A—B, the flux increases in A—B and decreases proportionally in segment C—D. The flux going out to the left and right is equal so that the output is not affected when the conductor is moved to the left or to the right. Flux going diagonally from the conductor affects the output when moving left to right adjacent to opposite ends of each of the segments or portions A—B and C—D. Thus any field produced by a conductor adjacent to or near open ends of a finely wound coil on a core or support will change output voltage induced from the windings resulting in appreciable error due to positioning of the conductor at certain end locations relative to the segments A—B and C—D. The toroid of Fig. 2a is circular and has a support 34 with adjacent ends 34a and 34b. Support 34 is a closed loop and carries a winding 36 which serves a function similar to that of winding 32 of the instrument of Fig. 2. Use of the toroidal coil of the closed loop type illustrated in Figures 2 and 2a is limited to welding apparatus where parts of the welding apparatus can be readily dismantled for positioning of the pickup instrument in a proper position where there is no distortion or inaccuracy in the voltage induced proportional to the current in the current carrying member.

Experiments conducted using a U-shaped pickup coil in which a segment such as A—D of the pickup structure of Fig. 2 is removed, indicated that in certain locations there is a low sensitivity due to the length of the pickup coil especially since the current carrying member must be disposed in a predetermined position relative to a particular winding on the pickup instrument for obtaining a predetermined induced voltage used to provide a metering or indication of the magnitude of the secondary resistance welding current. It was found that a U-shaped pickup coil when placed around a current-carrying member is unsatisfactory for detecting currents because of distortion due to opening of the pickup coil at one end and windings extending around the closed end of the pickup coil which are effective in induction of an unwanted component of E.M.F.

The parallel-type pickup coil or instrument of the present invention is outlined in Fig. 3c and comprises a pair of parallel rods or insulating material supports 42 each at least substantially ½ inch in diameter and each carrying finely wound coils and insulating material thereon as will be described in further detail below. The rods are joined at one end to an end member 44 having a cord outlet passage 45 and a spacing means or stop member 46 provided therewith. The stop member 46 extends laterally between portions 42a adjacent to ends of each of the rods 42 and a predetermined length or longitudinal measurement is necessary for this spacing means 46 in accordance with the present invention. Ends of the rods 42 are attached to the end member 44. Ends 42f of each of the rods or support members 42 are insertable at their free ends into recesses or openings provided in an end cap 48 similar in structure to the end member 44 and also providing a spacing means 46a in accordance with the present invention. The exact relationship of the spacing means 46 and 46a relative to windings provided in a predetermined manner on each of the rods or support members 42 will be described in greater detail below.

As illustrated in the side view of the pickup instrument in Fig. 3c, a current strap 18 can be positioned in any manner in the space laterally and longitudinally between the spacing means 46 and 46a and rods or wound support means 42. Using the pickup instrument 20 of the present invention, various positions in which the instrument can be used effectively are illustrated in the fragmentary views of welding apparatus and current straps outlined in Figures 3, 3a, 3b, and 3c. In these figures, a series of nine positions in which the pickup instrument 20 can be used effectively are indicated by a numeral encircled adjacent to the position together with an indication of an average of current readings obtained using a welding apparatus where all of the other fixtures and factors affecting secondary current measurement remain constant except for the positioning of the pickup instrument. These current readings are provided for purposes of illustration to show effective use of the pickup device of the present invention. Anywhere from one to 6 or more current cycles can be used for obtaining a current metering or indication in any one of these positions. A phase current meter when connected to the pickup instrument 20 located in position 1 of Fig. 3 indicated a reading of 13.0 kiloamps. In positions 2, 3, 5, 6, 8 and 9, a reading of 13.1 kiloamps is obtained consistently using the pickup instrument 20 of the present invention. In position 4 the pickup instrument is moved toward a portion of the welding apparatus where the structure of the welding apparatus itself is close to one side or one rod or support portion of the pickup coil and therefore there is some distortion in the effective 13.9 kiloamp reading obtained. A similar slight distortion is noticable in the 13.2 kiloamp reading obtained when the instrument of the present invention is located in position 7. Thus positions 4 and 7 away from the bottom curved central portion 18x as shown in the drawings of a secondary current conducting member or flexible strap 18 adjacent to the welding apparatus are to be avoided because of inaccuracy in the readings. However, as illustrated by the multiple positions other than locations 4 and 7, the pickup device 20 of the present invention can be used effectively in various locations on the welding apparatus without disassembling any part of the electrode or welding apparatus structure.

Referring more specifically to the structure of the pickup instrument of the present invention, Fig. 4 illustrates how the end member 44 is imbedded in an epoxy resin material or other insulating casing 40 serving as a protective cover for the end member and a winding which is carried on each of the rods or parallel supports 42. A bushing 41 is attached or press-fitted onto each rod adjacent opposite ends thereof where the winding terminates. Each bushing is adapted to fit into a recess provided by end member 44 or cap 48. Preferably the rods 42 are made of either Lucite or Bakelite or any other suitable thermosetting plastic material which is non-conductive and insulating relative to the windings. As shown in Fig. 4 and outlined in Fig. 3c, the end member 44 has a main body portion 44x intermediate lateral ends 44y and 44z and provides a spacing means 46 extending to one side thereof as more clearly visible in Fig. 6. The end spacing means 46 serves as a stop member against which a current carrying member such as the flexible strap 18 abuts and is limited in movement longitudinally relative to windings provided on the parallel rods 42. The rods have ends 42e which are inserted into a recess 44a of the member 44 including an enlarged recess portion 44b into which the bushing 41 fits. A bolt or stud fastening means 44e is forced into tight engagement with a longitudinal passage 42p in the end 42e of each of the rods 42.

An opposite end 42f of each of the rods is adapted to be inserted into a recess 48f of the cap or end member 48 also having a main body portion 48x intermediate laterial ends 48y and 48z having a recess as illustrated in Fig. 7. As noted earlier the cap or end member 48 has a spacing means or projecting portion 46a of the same predetermined length as that of spacing means 46 provided with the end member 44. A slightly enlarged recess portion 48g is provided adjacent to the recess 48f so that a tight engagement of the rod 42 having bushing 41 and ends 42f, respectively, can be made by press fitting or attaching the cap 48 relative to the substantially parallel rods 42. The end member 44 and cap 48 serve to hold the rods 42 in substantially parallel relationship. For the pickup instrument 20 of the present invention, it was found that a predetermined longitudinal distance of at least 2½ inches projection away from the main body portions 44x and 48x of the member 44 and cap 48 is required for the spacing means 46 and 46a. The pickup instrument 20 of the present invention is provided with a plurality of finely wound layers of wire separated by insulating material or insulating tape from adjacent layers and these windings necessarily extend the length of the rods 42 including portions 42a positioned laterally of the predetermined length of the spacing means 46 and 46a. Thus windings extend in spirals progressing longitudinally over rods 42 and are provided adjacent to opposite longitudinal edges of the spacing means and these windings are positioned laterally of the spacing means when the opposite ends of the rods are inserted into the recesses or openings provided in both the end member 44 and cap 46 for mounting of the rods in parallel relationship.

As illustrated schematically in Fig. 4, each of the Lucite or Bakelite rods 42 carries a plurality of layers of insulation and windings. Numerals one through six adjacent to arrows on lines indicate layers of wire wound onto rods or support members 42. The wiring begins at one end of a fitting 50 which is attached to a cord side 51 of the end member 44. A passage 45 extends through flange or end portion 44z of the end member 44 and a cutout 55 is provided for placing in a pair of conductors 56 and 57 of a cord in a recess which can be closed off by the epoxy resin or other insulating material used to encase the pickup instrument of the present invention. Each of the conductors 56 and 57 extend longitudinally as portions 56a and 57a in a path substantially parallel to the one rod 42 which is near the top of the layout view of Fig. 4. The portions 56a and 57a preferably are embedded in the epoxy resin or insulating material and terminate at ends 56b and 57b located adjacent to the end of the rod 42 remote from the end member 44. For purposes of clarity, portions 56a and 57a and ends 56b and 57b are illustrated schematically in Fig. 4 in positions remote from casing 40 though they are embedded therein.

A wire wrapping is begun beginning from the end of the rod 42 remote from the end member 44 progressively winding a uniformly placed number of turns per inch in a smooth layer of conductors beginning from a reference line 56c to a reference line 56d adjacent to flange portion 44z of the end member 44. A second layer is wound to place the continuing wiring in a back wound pattern by first wrapping an insulating material such as an acetate tape 57t at least .003-inch thick around the first layer of winding and then winding a second layer of wire moving from the reference line 56d to the right back to the reference line 56c. Then another layer of insulating material or acetate tape 57t at least .003 inch thick is placed longitudinally to insure uniform winding and is wrapped evenly over the second layer of wiring and a third layer of wire is wrapped again moving from a position at the reference line 56c to the left to a position at the reference line 56d. Another layer of insulating material or acetate tape to insure uniform winding on the next layer is wrapped around the third layer of wiring and the procedure of wrapping fine wire progressively around the rod 42 and previous layers of windings is repeated until finally 5 layers of windings have been wound onto the upper rod 42 and then the wire is cut at an end point 56e which is adjacent to a position indicated by a numeral 5 that is encircled in Fig. 4. The cut off end of the wire is moved and is referred to as a new end 57e located in a position marked with a numeral 1 which is enclosed by a square in Fig. 4. The wire from the end 56e is placed laterally across an end of the spacing means 46 adjacent to the body of the end member 44 in a lateral groove 46w extending from a point adjacent to an end of upper rod to a point adjacent to an end of the lower rod adjacent to the body of the end member 44.

A winding is begun progressively placing fine wiring over the lower insulating material rod 42 and moving to the right as viewed in Fig. 4. Layer 1 begins with a winding starting adjacent to a reference line 57d and extending to a reference line 57e. After the wiring has been placed as the first layer onto lower rod 42, an insulating wrapping such as acetate tape 57t is provided over the first layer of wiring and then the wiring is wrapped moving to the left from the reference line 57e back to the reference line 57d. Again a layer of insulating material or tape is wrapped over the wiring and another layer of wiring is added progressively from the reference line 56d to the reference line 56e. The procedure of providing progressive windings in multiple layers continues until a total of six layers has been completely wound in an insulated condition onto the rod 42. Then the last turns of the sixth layer terminate adjacent to the reference line 57d which brings an end 57f of the wiring to a position adjacent the end of the spacing means 46 adjacent to end member 44.

The location of the end 57f of the wire is indicated by a numeral 6 within a square or box showing where the wire at the end 57f is cut. The cut end 57f is then suitably attached to the end 56e as schematically indicated by a jumper 58 and a free end 56f of the cut wire is moved to a position near the end 57e which is joined by a jumper 59 to connect ends 57e and 57f to each other. It is to be understood that a solder connection or even a twisted wire connection can be used for effecting the connections 58 and 59. The end 56f of the wire at a position identified by a numeral 6 enclosed by a circle in Fig. 4 is then used as a starting point for a sixth layer wound onto the upper rod 42 beginning from the reference line 56d and progressively providing turns of winding in a direction to the right toward the reference line 56c. An end of this wire is then connected to the end of the conductor 57b which is connected in series with the conductor portion 57a and wire 57 leading through the passage 45 and fitting 50 to the cord side of the device. It is apparent that the winding provided on both of the rods 42 is a back winding.

The schematic representation of the windings in Fig. 4 is intended to indicate that a total of 6 layers are provided on each of the rods 42 and three of these layers extend as wound progressively to the left and three of the layers extend as wound progressively to the right on each of the rods. By cutting the wires and joining ends 56e—57f and 57e—56f insulated relative to each other in groove 46w by the resin casing 40 all of the turns of the wiring are connected in series and there is a uniform winding evenly and tightly placed onto each of the rods 42. Since the wire from the end of the fifth layer on the first coil is connected to the first layer of wire on the second coil on the second rod and since the sixth layer of the second or lower rod 42 is connected to the wire beginning the sixth layer of the first coil on the upper rod 42, the coils are all in series and any one turn effect is eliminated because of the even distribution of wiring exposed to flux from a conductor which can be positioned anywhere within a space 60 located within the confines of the upper and lower rods 42 between laterally inner edges 46x and 46y of the spacing means 46 and 46a respectively. The relationship of the edges 46x and 46y relative to the space 60 as to the current carrying conductor 18 is shown in the view of Fig. 3 that illustrates position 9 of the pickup instrument of the present invention. Fig. 4a is an enlarged fragmentary cross-sectional view on one of the rods 42 having alternate layers of wiring and insulating tape 57t thereon. A portion of the resin or insulating casing 40 is also shown in Fig. 4a.

It is clear that layers of windings are provided on each of the rods 42 extending laterally of the spacing means 46 and 46a of the end member and cap respectively. Because of this relationship of the ends of the layers of windings, the spacing means extend a predetermined distance longitudinally and laterally of these ends of the windings and a current strap can be moved to the left or to the right within the space 60 and can be positioned up or down anywhere within this space without changing the induced voltage effected by current passing through a current carrying member or flexible strap such as 18. An electrode or flexible strap or any other current carrying member can be easily positioned between the rods 42 and spacing means 46 and 46a because the cap 48 is removable from the free end of each of the rods 42. The spacing means are preferably a projection or stop member provided integrally with the end member and cap at each of opposite ends of the space 60 but it is to be understood that a strap or bracket could also be provided for being clamped laterally across wound end portions 42a of the rods 42 so that a minimum 2½ inch projection is provided at each of opposite ends of the space 60. Groove 46w provided on one side of end member 44 assures that the winding ends are protected in a recess as are wires 56—57 in cutout 55 of end member 44.

Sensitivity of the pickup coil instrument of the present invention is based primarily on the turns per inch or per centimeter and a coil to receive a larger current strap or current carrying member would require a larger, longer coil but with the same number of turns per inch or per centimeter. Preferably at least 528 turns per inch and a resistance of 220 ohms with six layers on each rod are provided by using wiring such as Formvar AWG #30 wire. A difference in size will result in a slight loss of sensitivity on a larger coil due to additional coil resistance. But with the pickup coil of the present invention many advantages are obtained because the pickup coil instrument is adaptable to a larger number of production resistance welders and welding apparatus.

The parallel type pickup coil of the present invention permits easy and quick installation of a sensitive parallel-type pickup coil around a current strap. Preferably the coil is placed at a bottom portion of a current strap in a position illustrated in Fig. 1. The preferred positions are identified further by numerals 3, 5, and 8 in Figures 3, 3a and 3b and it is apparent that these positions are at the bottom portion 18x of the current strap or flexible current carrying member of welding apparatus. Another advantage of the present pickup coil is apparent by the illustration of position 9 in Fig. 3c indicating that a current strap can be positioned anywhere in the space 60 and substantially consistent current readings are obtainable regardless of the position of the current carrying member relative to the spacing means 46 and 46a and upper and lower rods 42 on which the windings are provided as described earlier. By having at least 2½ inches of coil beyond edges 46x and 46y, the output from the pickup device of the present invention will not vary due to change of position of a current-carrying member anywhere in space 60. The magnetic field produced by a conductor above or below the coil will have no effect since the voltage induced in one side of the coil will cancel the induced voltage in the other side. The back winding eliminates any one turn effect that results in inaccuracy. The number of layers can be greater or fewer than the six for each rod as described above but sensitivity is determined by the number of turns of wire per inch for a given coil. When a minimum of 2½ inches longitudinally of spacing means such as 46 is provided laterally between wound end portions 42a, error if any, in current readings is negligible.

U-type pickup coils are unsuitable because of distortion and inaccuracy of indication obtained where they are used. Split-core pickup coils due to mechanical wear on the core and wire and due to the gap between the ends of the coils are unsatisfactory for detecting currents.

While the embodiment of the present invention as herein disclosed constitutes a preferred form, it is to be understood that other forms might be adopted.

What is claimed is as follows:

1. A pickup-coil measuring instrument for use in combination with a current-carrying member and so arranged and constructed to permit detecting welding current, comprising, a pair of substantially parallel insulating support portions having predetermined open space therebetween to receive the current-carrying member, wire wound back and forth in layers series connected electrically relative to each other on each of said support portions, and spacing means attached to ends of said support portions for maintaining said support portions substantially parallel to each other, said spacing means including a projection provided to extend a predetermined distance between wound end portions laterally thereof for eliminating positioning of a current-carrying member in a location where electromotive force induced in said instrument would effect distortion and inaccuracy because of positioning other than in said predetermined open space.

2. In combination for measuring current in a current-carrying member, an air-core pickup-coil instrument adapted to be positioned relative to a current-carrying member and adapted to be fitted relative thereto without disassembly of any supporting fixtures of the current-carrying member, comprising, a pair of substantially parallel insulating material support members, a predetermined number of turns of wire wound onto said support members through which an electromotive force is induced by electromagnetic induction in proportion to electricity passing through the current-carrying member when the latter is positioned between the parallel support members carrying the wire, end members joining ends of said support members, and stop means provided laterally adjacent to wire wound ends of said support members, said stop means being adapted to limit movement of the current-carrying member to a predetermined distance longitudinally away from wire wound ends of said support members.

3. A measuring pickup instrument so arranged and constructed to be used in combination for coupling an electrical indicating means relative to a current strap of a resistance welding apparatus, comprising, a winding of a predetermined number of turns of wire per inch, insulating material supports adapted to be installed around the current strap, an end member attached to one end of each of said supports, a cap having recesses into which an opposite end of each of said supports is insertable, said cap serving to close off an opening between said supports opposite said end member, and spacing means having a predetermined length relative to wire wound ends of said supports, said end member having a groove on one side extending between positions adjacent to each wire wound end of each of said insulating material supports, the groove being adapted as a recess in which portions of windings are connected in series with each other relative to said supports, and an insulating material casing surrounding said pickup instrument including the winding and groove.

4. A pickup coil means comprising, substantially parallel insulating material rods, windings carried only on said rods and wrapped in layers separated by insulation provided to assure uniform winding, end-joining means attached to ends of said rods, and spacing means extending laterally from said end-joining means for only a predetermined distance between wound ends of said rods, said end-joining means providing a passage and cutout portion adapted to receive a pair of conductors positioned extending longitudinally of one of said rods to a location remote from said end-joining means, said windings starting from the location remote from the end-joining means and ending also at the location remote from said end-joining means.

References Cited in the file of this patent
UNITED STATES PATENTS

| | | |
|---|---|---|
| 2,175,934 | Wentz | Oct. 10, 1939 |
| 2,351,055 | Lakhovsky | June 13, 1944 |
| 2,462,651 | Lord | Feb. 22, 1949 |
| 2,674,659 | Buhrendorf | Apr. 6, 1954 |
| 2,804,577 | Roth | Aug. 27, 1957 |